US009501720B2

(12) United States Patent
Kamiya (10) Patent No.: US 9,501,720 B2
(45) Date of Patent: Nov. 22, 2016

(54) OBJECT DETECTION APPARATUS

(71) Applicant: DENSO CORPORATION, Kariya, Aichi-pref. (JP)

(72) Inventor: Yasunori Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 295 days.

(21) Appl. No.: 14/282,316

(22) Filed: May 20, 2014

(65) Prior Publication Data

US 2014/0348383 A1 Nov. 27, 2014

(30) Foreign Application Priority Data

May 21, 2013 (JP) .................................. 2013-107119

(51) Int. Cl.
*G06K 9/62* (2006.01)
*G06K 9/00* (2006.01)
*G08G 1/16* (2006.01)

(52) U.S. Cl.
CPC ......... *G06K 9/6255* (2013.01); *G06K 9/00362* (2013.01); *G06K 9/00791* (2013.01); *G06K 9/00805* (2013.01); *G08G 1/166* (2013.01)

(58) Field of Classification Search
CPC .... G06K 9/36; G06K 9/4642; G06K 9/6201; G06K 9/6202; G06K 9/6255; G06K 9/00624; G06K 9/00791
USPC ........................................ 382/181, 218, 220
See application file for complete search history.

(56) References Cited

U.S. PATENT DOCUMENTS

| 5,214,717 A * | 5/1993 | Kimura ................. G06K 9/685 382/202 |
| 7,856,122 B2 * | 12/2010 | Enomoto ........... G06K 9/00288 382/115 |
| 2004/0183906 A1 | 9/2004 | Nagaoka et al. |

(Continued)

FOREIGN PATENT DOCUMENTS

| JP | 2003-006642 | 1/2003 |
| JP | 2004-303219 | 10/2004 |

(Continued)

OTHER PUBLICATIONS

Schneiderman, et al. "Object Detection Using the Statistics of Parts." International Journal of Computer Vision 56.3 (2004): 151-77. Web.*

(Continued)

*Primary Examiner* — Michael A Newman
(74) *Attorney, Agent, or Firm* — Harness, Dickey & Pierce, P.L.C.

(57) ABSTRACT

An object detection apparatus for detecting a target object in an input image. The apparatus includes a storage storing, for each of a plurality of part areas forming an area subject to image recognition processing, image recognition dictionaries used to recognize a target object and typed according to variations in appearance of a part of the target object to be detected in the part area. A part score calculator calculates, for each of the part areas, a part score indicative of a degree of similarity between the part area and each of at least some of the image recognition dictionaries. An integrated score calculator calculates an integrated score that is a weighted sum of the part scores for the respective part areas. A determiner determines, on the basis of the integrated score, whether or not the target object is present in the subject area.

9 Claims, 9 Drawing Sheets

FULL BODY DICTIONARY

PART-B DICTIONARY GROUP

(56) References Cited

U.S. PATENT DOCUMENTS

| | | | |
|---|---|---|---|
| 2005/0276447 A1 | 12/2005 | Taniguchi et al. | |
| 2007/0291987 A1 | 12/2007 | Saka et al. | |
| 2009/0208116 A1* | 8/2009 | Gokturk | G06F 17/30259 382/209 |
| 2011/0090359 A1* | 4/2011 | Sagawa | G06K 9/3233 348/222.1 |
| 2011/0091117 A1* | 4/2011 | Sakamoto | G06K 9/00248 382/218 |
| 2012/0063689 A1* | 3/2012 | Tran | G06K 9/00281 382/224 |
| 2012/0201468 A1 | 8/2012 | Oami et al. | |
| 2013/0148881 A1* | 6/2013 | Xue | G06K 9/6256 382/159 |
| 2013/0163831 A1* | 6/2013 | Tanaka | G06K 9/00926 382/118 |
| 2013/0301911 A1 | 11/2013 | Rong et al. | |
| 2015/0023596 A1 | 1/2015 | Oami et al. | |

FOREIGN PATENT DOCUMENTS

| | | |
|---|---|---|
| JP | 2005-354597 | 12/2005 |
| JP | 2007-334751 | 12/2007 |
| JP | 2008-181423 | 8/2008 |
| JP | 2010-239992 | 10/2010 |
| JP | 2011-090413 | 5/2011 |
| JP | 2012-108785 A | 6/2012 |
| WO | WO 2011/046128 | 4/2011 |

OTHER PUBLICATIONS

Office Action dated Apr. 28, 2015 in corresponding Japanese Application No. 2013-107119.

* cited by examiner

FULL BODY DICTIONARY

FIG.2B

PART-B DICTIONARY GROUP

FIG.2C

PART-C DICTIONARY GROUP

FIG.3A

| SCENES | DICTIONARIES | |
|---|---|---|
| | BODY PART B | BODY PART C |
| S1 | B1, B2, B3 | C1, C2, C3, C4 |
| S2 | B1, B4, B5 | C1, C2, C5, C6 |
| S3 | B2, B6 | C3, C4 |
| ⋮ | ⋮ | ⋮ |

FIG.3B

| WEIGHTING FACTORS | | BODY PART C | | | |
|---|---|---|---|---|---|
| | | C1 | C2 | C3 | ... |
| BODY PART B | B1 | $\beta_{11}$ $\gamma_{11}$ | $\beta_{12}$ $\gamma_{12}$ | $\beta_{13}$ $\gamma_{13}$ | ... |
| | B2 | $\beta_{21}$ $\gamma_{21}$ | $\beta_{22}$ $\gamma_{22}$ | $\beta_{23}$ $\gamma_{23}$ | ... |
| | B3 | $\beta_{31}$ $\gamma_{31}$ | $\beta_{32}$ $\gamma_{32}$ | $\beta_{33}$ $\gamma_{33}$ | ... |
| | ⋮ | ⋮ | ⋮ | ⋮ | ⋮ |

| STATE AND SCENE | | BODY PART C | | | |
|---|---|---|---|---|---|
| | | C1 | C2 | C3 | ... |
| BODY PART B | B1 | S11 | S12 | S13 | ... |
| | B2 | S21 | S22 | S23 | ... |
| | B3 | S31 | S32 | S33 | ... |
| | ⋮ | ⋮ | ⋮ | ⋮ | ⋮ |

OBJECT DETECTION APPARATUS

CROSS-REFERENCE TO RELATED APPLICATION

This application is based on and claims the benefit of priority from earlier Japanese Patent Application No. 2013-107119 filed May 21, 2013, the description of which is incorporated herein by reference.

BACKGROUND

1. Technical Field

The present invention relates to an object detection apparatus for detecting a target object from an input image with use of an image recognition dictionary.

2. Related Art

Conventionally, techniques are known for detecting a target object that is an object to be detected, such as a person or a vehicle present forward or rearward of a subject vehicle, use a recognition dictionary describing data representing features of the target object (an outline and other features thereof) to extract, from an input image captured by a camera or the like, an area having a high degree of similarity to the recognition dictionary.

In addition, techniques, as disclosed in Japanese Patent Application Laid-Open Publication No. 2008-181423, have been proposed for providing robust recognition by dividing a region to be recognized into a plurality of part regions, and for each part region, selecting an identification method among a plurality of identification methods and applying the selected method to the part region.

A target object, an object to be detected, may vary greatly in outline depending on viewing directions or may be deformed partially in outline depending on viewing directions. Particularly, for a human or the like that may differ greatly in appearance (such as colors, designs and figures) depending on hair styles, dress, postures, and moving directions and others, an enormous number of recognition dictionaries will be required to recognize the human in all the variations in his/her appearance.

In consideration of the foregoing, it would therefore be desirable to have techniques for more accurately detecting a target object having a higher appearance variance by image recognition processing.

SUMMARY

In accordance with an exemplary embodiment of the present invention, there is provided an object detection apparatus. The apparatus includes a storage storing, for each of a plurality of part areas forming an area, in an input image, subject to image recognition processing referred to as a subject area, image recognition dictionaries used to recognize a target object that is an object to be detected in the input image and typed according to variations in appearance of a part of the target object to be detected in the part area. In the apparatus, a part score calculator is configured to calculate, for each of the part areas forming the subject area, a part score indicative of a degree of similarity between the part area and each of at least some of the image recognition dictionaries stored in the storage. An integrated score calculator is configured to calculate an integrated score by selecting, for each of the part areas forming the subject area, one of the scores calculated in the part score calculator and then calculating a weighted sum of the selected part scores for the respective part areas of the subject area. A determiner is configured to determine, on the basis of the integrated score calculated in the integrated score calculator, whether or not the target object is present in the subject area.

The object detection apparatus of the above embodiment represents, for each of the part areas, variations in appearance of the part of the target object appearing in the part area through the image recognition dictionaries, and represents variations in appearance of the full target object through combinations of the image recognition dictionaries for the respective part areas, which allows the number of the image recognition dictionaries for the respective part areas required to represent the variations in appearance of the full target object to be less than the number of appearance variations of the full target object.

With the object detection apparatus of the above embodiment, even in the presence of a large number of variations in appearance of the target object, the target object can be detected more accurately by means of a smaller number of image recognition dictionaries for the respective part areas than the number of appearance variations of the full target object, and the detection accuracy can be increased.

The present invention can also be implemented in numerous ways other than as the object detection apparatus set forth above, including as various systems including the above object detection apparatus, a object detection method, or a computer readable medium such as a computer readable storage medium or a computer network wherein program instructions are executed to implement various functions of the object detection apparatus.

DESCRIPTION OF SPECIFIC EMBODIMENTS

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

First Embodiment

System Configuration

Figure 1:
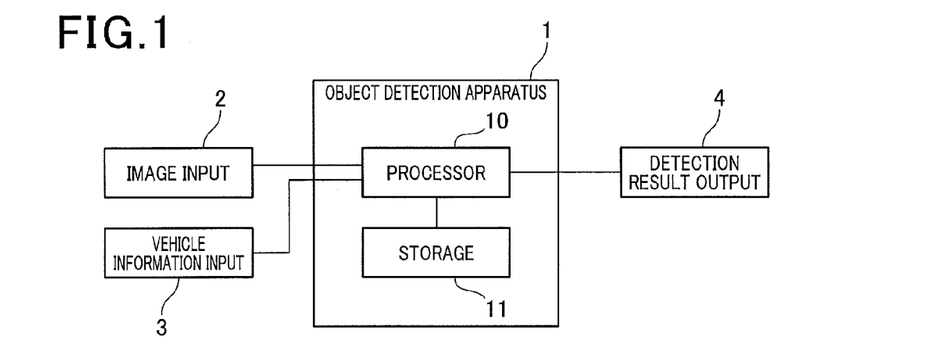
FIG. 1 shows a schematic block diagram of a object recognition system in accordance with a first embodiment of the present invention.

An object detection system in accordance with a first embodiment of the present invention is mounted in a vehicle (hereinafter referred to as a subject vehicle) and is used to detect a specific target object, such as a person, a vehicle, a road sign or the like present forward of the subject vehicle. As shown in FIG. 1, the object detection system includes an object detection apparatus 1, to which an image input 2, a vehicle information input 3, a detection result output 4 and others are communicably connected.

The image input 2 includes a vehicle-mounted camera or the like to capture an image forward of the subject vehicle. The captured image is fed from the image input 2 to the object detection apparatus 1 as an input image. The vehicle information input 3 includes various sensors installed in the subject vehicle to detect a vehicle behavior and an external environment around the subject vehicle, and various operating devices, such as switches and levers, to feed various information to the object detection apparatus 1 for determining operating states of various vehicle-mounted devices, such as lighting devices and wipers. The information generated in the sensors and the operating devices is hereinafter referred to as vehicle information.

The detection result output 4 alerts a driver of the subject vehicle of the presence of a vehicle or a person, and/or controls the subject vehicle, in response to a detection result from the object detection apparatus 1. The detection result output 4 includes, but is not limited to, a controller of a vehicle driving safety system or a driving aid system.

(Object Detection Apparatus)

The object detection apparatus 1 includes a processor 10 and a storage 11. The processor 10 functions as an information processor, such as a microcomputer, including a central process unit (CPU), a read-only memory (ROM), a random access memory (RAM), an I/O interface and others. The processor 10 is operable to detect a target object in the input image from the image input 2 and conduct image recognition process to output object information generated on the basis of the detection result. The storage 11 stores programs for the image recognition process to be executed in the information processor, recognition dictionaries for use in the image recognition process, and various tables and others used in narrowing the recognition dictionaries and/or setting weighting factors as described later.

The recognition dictionaries are each configured to describe data representing features of pixels included in an image area where the target object appears in the input image. More specifically, the features may be data describing contours of the target object (e.g., a position thereof) or may be a calculated value obtained by applying predetermined operations to pixel values (e.g., an average thereof), a histogram or the like.

In addition, the recognition dictionaries include a full body dictionary representing a full body of the target object, and for each of body parts of the target object, a plurality of body part dictionaries representing the body part of the target object. The body part dictionaries for each of the body parts of the target object are typed according to variations or differences in appearance of the body part. All of the recognition dictionaries are described by the same types of features.

The recognition dictionaries used in detecting a person (e.g., a pedestrian) as an example of the target object will now be explained with reference to FIG. 2. Alternatively, a vehicle, a roadside object, a road marking or the like may be used as another example of the target object.

Figure 2A:
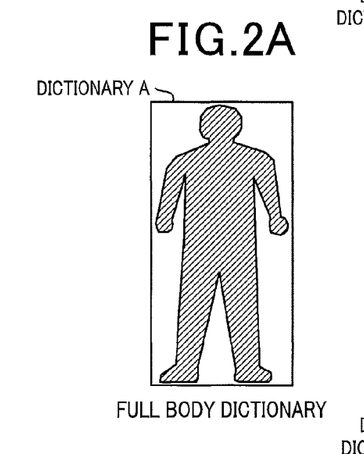
FIG. 2A shows an example of full body dictionary for a full body of a pedestrian as a target object.
Figure 2B:
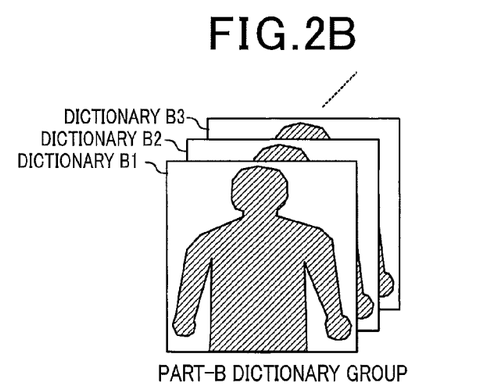
FIG. 2B shows an example of body part dictionaries for an upper body of the pedestrian.
Figure 2C:
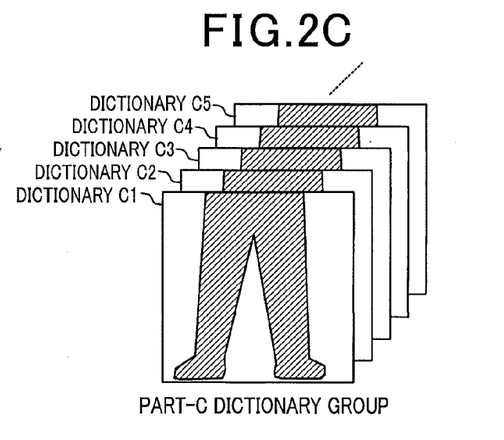
FIG. 2C shows an example of body part dictionaries for a lower body of the pedestrian.

The recognition dictionaries include a full body dictionary A representing a full body of a person as the target object as shown in FIG. 2A, and body part dictionaries representing their respective body parts of the person as shown in FIG. 2B. The full body dictionary A is applied to a whole area to which the image recognition process is applied. The body part dictionaries are applied to their respective part areas that are portions of the whole area.

In the present embodiment, the body part dictionaries are grouped in two groups of at least two dictionaries, let us say a part-A dictionary group and a part-B dictionary group. The part-A dictionary group and the part-B dictionary group are respectively associated with an upper body (referred hereinafter to as a body part B) and an lower body (referred hereinafter to as a body part C). The whole area to which the image recognition process is applied is divided into upper and lower part areas, where the part-B dictionary group is applied to the upper part area and the part-C dictionary group is applied to the lower part area.

The part-B dictionary group includes a plurality of part-B dictionaries B1, B2, B3, . . . typed according to variations in appearance, such as color, design and figure, of the upper body. The part-C dictionary group also includes a plurality of part-C dictionaries C1, C2, C3, . . . typed according to variations in appearance, such as color, design and figure, of the lower body.

Figure 3A:
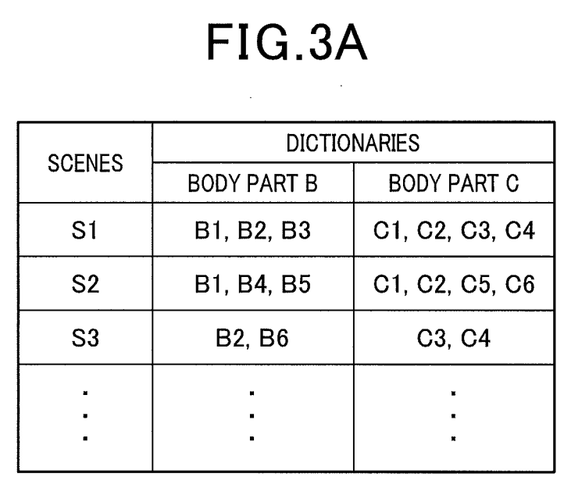
FIG. 3A shows an example of dictionary selection table used to select body part dictionaries depending on a scene.

A dictionary selection table used to select a recognition dictionary, as shown in FIG. 3A, shows, for each of various scenes of the input image S1, S2, . . . (such as sunny weather, rainy weather, daylight hours, evening hours and others) estimated from detection results of the vehicle information input 3, body part dictionaries used in the scene for each body part.

The dictionary selection table shows, for each scene Si (i=1, 2, 3, . . . ), which type or types of body part dictionaries should be used in the image recognition process for each body part. This table may be designed through experiments, simulations and others.

Figure 3B:
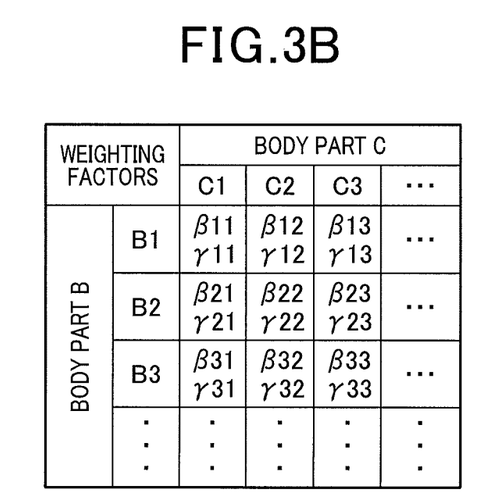
FIG. 3B shows an example of weighting factor selection table used to calculate an integrated score depending on the scene.

A weighting factor selection table as shown in FIG. 3B shows, for each pair of the part-B dictionary Bj and the part-C dictionary Ck (j=1, 2, . . . , k=1, 2, . . . ), weighting factors $\beta jk$, $\gamma jk$ to be applied to their respective scores calculated using the part-B dictionary Bj and the part-C dictionary Ck as described later.

The weighting factor selection table is configured such that the weighting factors in the table are set lower for unusual combinations of the upper and lower bodies, such as a combination of the forward facing upper body and the laterally facing lower body and a combination of the forward face and the backward legs).

(Image Recognition Process)

An image recognition process performed in the processor 10 of the object detection apparatus 1 will now be explained with reference to a flowchart of FIG. 3. This process is preceded by another process of calculating features of the input image each time the processor 10 acquires the input image from the image input 2.

Figure 4A:
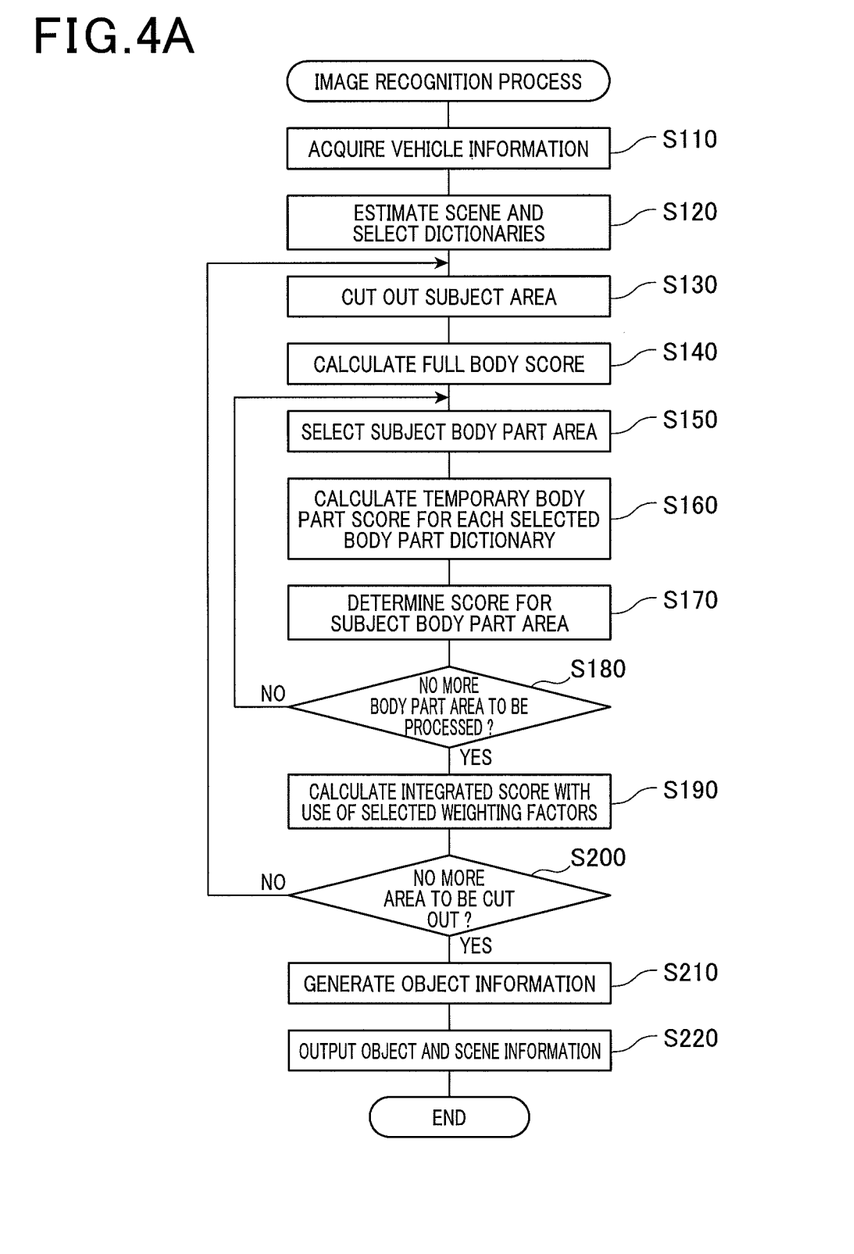
FIG. 4A shows a flowchart of an image recognition process in accordance with the first embodiment.

In step S110, the processor 10 acquires, from the vehicle information input 3, vehicle information indicative of operating states of the light switch and the wiper switch. The operating states of the light switch include on, off, the low beam mode, the high beam mode, and the like. The operating states of the wiper switch include on, off, an operating speed, an operating interval, and the like.

In step S120, the processor 10 estimates a scene representing the surroundings of the subject vehicle on the basis of the vehicle information acquired in step S110 and selects the recognition dictionary used in the following operations with reference to the dictionary selection table as shown in FIG. 3A. For example, when the light switch is on, the scene is estimated to be the evening hours. When the wiper switch is on, the scene is estimated to be the rainy weather.

In step S130, the processor 10 cuts, from the input image, an area of predetermined size such that the full body dictionary A can be applied to the area. The area cut from the input image is hereinafter referred to as a cut-out area.

In step S140, the processor 10 calculates a score indicative of a degree of similarity in features between the cut-out area acquired in step S130 (as an area subject to the image recognition process) and the full body dictionary A in a well-known manner, which manner will therefore not explained in detail. The calculated score is referred to as a full body score.

In step S150, the processor 10 selects one of the part areas, for which further operations in steps S160-S180 (as described later) have not yet been performed. The selected part area is hereinafter referred to as a subject body part area.

In step S160, the processor 10 calculates, for each of the body part dictionaries selected in step S120 for the subject body part area selected in step S150, a score indicative of a degree of similarity in features between the subject body part area and the body part dictionary. Each score calculated in step S160 is referred to as a temporary body part score.

In step S170, the processor 10 determines a maximum of the temporary body part scores calculated in step S160 for the respective body part dictionaries as a body part score (that is a representative score) for the subject body part area.

In step S180, the processor 10 determines whether or not the operations in steps S150-S170 have been performed for all the respective part areas included in the subject area. If there is a part area for which the operations in steps S150-S170 have not yet performed, then the process returns to step S150. If the operations in steps S150-S170 have been performed for all the respective part areas, then the process proceeds to step S190.

In step S190, the processor 10 calculates an integrated score that is a weighted sum of the full body score calculated in step S140 and the body part scores calculated in step S170 for the respective part areas for the subject area, where the weighting factor for the full body score may be a fixed value and the weighting factor for each body part area is given by a weighting factor for the body part dictionary used to calculate the body part score for the part area.

More specifically, the integrated score T is calculated according to the following equation (1).

$$T = \alpha \times Pa + \beta jk \times Pb + \gamma jk \times Pc \quad (1)$$

where Pa is the full body score, Pb is the body part score for the part area for the body part B, and Pc is the body part score for the part area for the body part C. $\alpha$ is the weighting factor for the full body score, $\beta jk$ is the weighting factor for the body part score for the part area for the body part B, and $\gamma jk$ is the weighting factor for the body part score for the part area for the body part C.

In step S200, the processor 10 determines whether or not there is another area to be cut from the input image. If there is another area to be cut from the input image, then the process returns to step S130 and the operations in steps S130-S190 are repeated for the other cut-out area. If there are no more areas to be cut from the input image, then the process proceeds to step S210.

In step S210, the processor 10 extracts, from all the cut-out areas, areas (or an area) having the integrated score equal to or greater than a predetermined threshold, and determines that target objects are present in the respective extracted areas. Thereafter, the processor 10 generates, for each of the extracted cut-out areas, object information about the target object present in the extracted cut-out area, including at least a type of the target object and a position of the target object in the input image.

In step S220, the processor 10 outputs, to the detection result output 4, scene information representing the estimate in step S120 together with the object information generated in step S210. Thereafter, the process ends.

Figure 4B:
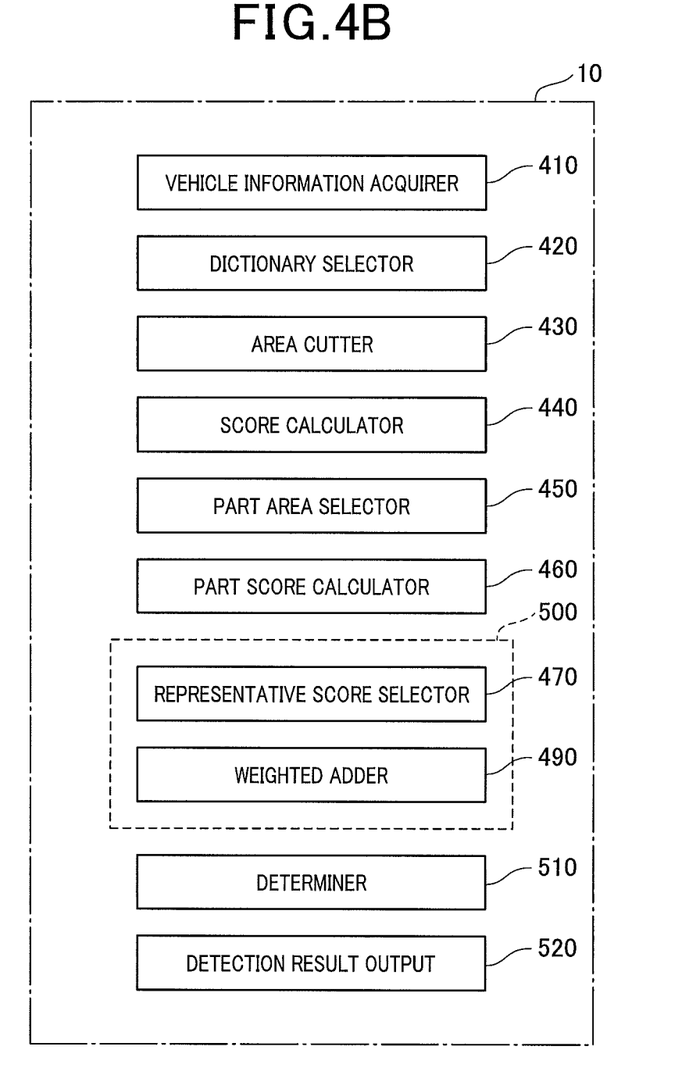
FIG. 4B shows a schematic block diagram of a processor of FIG. 1.

Referring to FIG. 4B, the processor 10 of the present embodiment includes a vehicle information acquirer 410 responsible for executing the operation in step S110, a dictionary selector 420 responsible for executing the operation in step S120, an area cutter 430 responsible for executing the operation in step S130, a score calculator 440 responsible for executing the operation in step S140, a part area selector 450 responsible for executing the operation in step S150, a part score calculator 460 responsible for executing the operation in step S160.

The processor 10 further includes an integrated score calculator 500 responsible for executing the operations in steps S170, S190, a determiner 510 responsible for executing the operation in step S210, a detection result output 520 responsible for executing the operation in step S220. More specifically, the integrated score calculator 500 includes a representative score selector 470 responsible for executing the operation in step S170 and a weighted adder 490 responsible for executing the operation in step S190.

All these components of the processor 10 may be embodied by executing their associated computer programs stored in ROM (not shown) or the like of the processor 10.

(Benefits)

As described above, the object detection apparatus 1 calculates the integrated score that is a weighted sum of the full body score calculated from the full body dictionary A and the body part scores for the respective part areas forming the subject (cut-out) area calculated from the body part dictionaries, where the weighting factors for the respective body part areas forming the subject area are determined as a function of validity of the combination of the body part areas. A plurality of body part dictionaries are provided for each of the body parts of the target object according to variations in appearance of the body part. The temporary body part scores are calculated for the respective body part dictionaries, and the maximum of the temporary body part scores is determined as the body part score.

That is, the object detection apparatus 1 of the present embodiment represents, for each of the part areas, variations in appearance of the body part through the body part dictionaries, and represents variations in appearance of the full body through combinations of the body part dictionaries for the respective part areas, which allows the number of the body part dictionaries for the respective part areas required to represent the variations in appearance of the full body to be less than the number of full body appearance variations. Therefore, with the object detection apparatus 1 of the present embodiment, even in the presence of a large number of variations in full body appearance, the target object can be detected more accurately by means of a smaller number of the body part dictionaries for the respective part areas than the number of full body appearance variations.

In addition, with the object detection apparatus 1 of the present embodiment, the integrated score is adjusted by altering the weighting factors for the respective body part scores according to the combinations of the body part dictionaries for the respective part areas. This allows the integrated score for an unusual combination of the body parts forming the full body to be reduced, thereby preventing false detection and thus leading to enhancement of the detection accuracy.

The object detection apparatus 1 of the present embodiment narrows the body part dictionaries that can be applied to the respective part areas depending on the scene estimated from the vehicle information, which can reduce a time period required to perform the image recognition process.

Second Embodiment

There will now be explained a second embodiment of the present invention. The second embodiment differs only in the image recognition from the first embodiment. Only differences of the second embodiment from the first embodiment will be explained.

(Image Recognition Process)

Figure 5A:
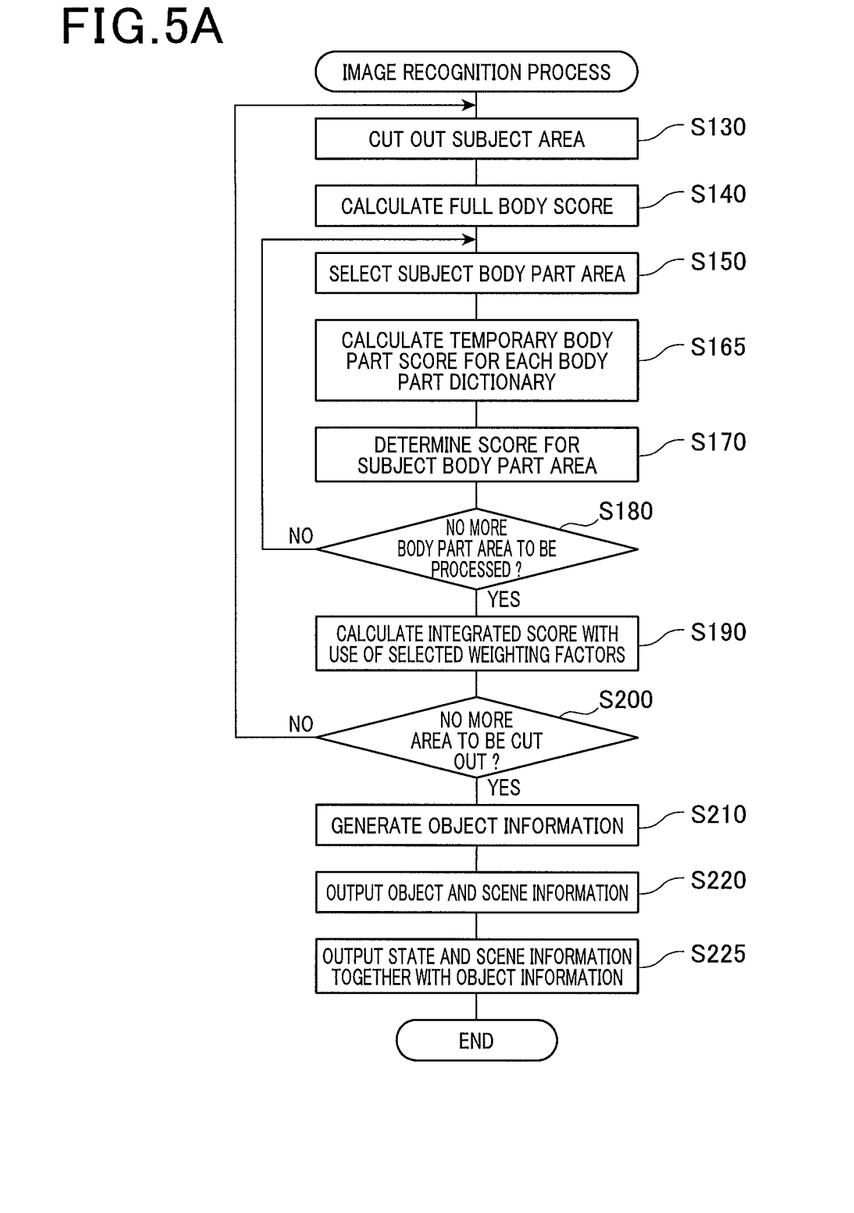
FIG. 5A shows a flowchart of an image recognition process in accordance with a second embodiment.

In the present embodiment, the image recognition process performed in the processor 10, as shown in FIG. 5A, is similar to the image recognition process of FIG. 4A except that steps S110, S120 are removed, steps S165, S225 are provided in place of S160, S220, and step S215 is inserted between step S210 and step S220.

That is, in the present embodiment, the processor 10 is configured to calculate the temporary body part scores for all the respective body part dictionaries for the subject body part area in step S165 without selecting the recognition dictionaries on the basis of the vehicle information.

In addition, in step S215, the processor 10 estimates, from the combination of the body part dictionaries used in step S170 to calculate the body part scores for all the respective part areas for the subject area, a state of the target object (such as a body posture) and/or a scene represented by the input image. Thereafter, in step S225, the processor 10 outputs, to the detection result output 4, state and scene information representing the estimate in step S215 together with the object information generated in step S210.

Figure 6:
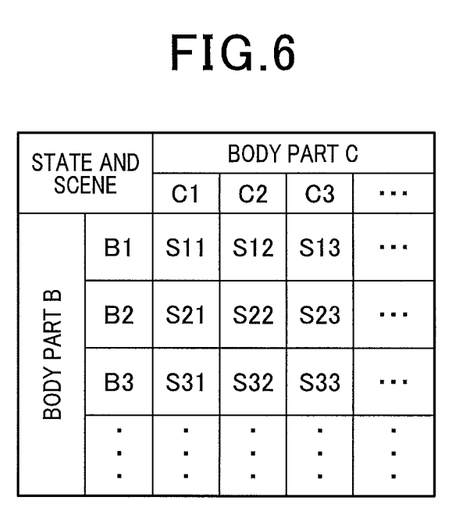
FIG. 6 shows an example of scene estimation table used to estimate a scene from a combination of body part dictionaries used to calculate an integrated score.

The estimate of the state and scene of the target object is conducted using a state and scene estimate table stored in the storage 11. The state and scene estimate table, as shown in FIG. 6, describes the state and scene Sjk of the target object for the body part dictionary Bj belonging the part-B dictionary group and the body part dictionary Ck belonging the part-C dictionary group.

More specifically, for example, given the part-B dictionary group formed of the body part dictionaries associated with respectively different body postures, the target object can be estimated to adopt a body posture represented by the body part dictionaries for the respective part areas used to calculate the integrated score.

Figure 5B:
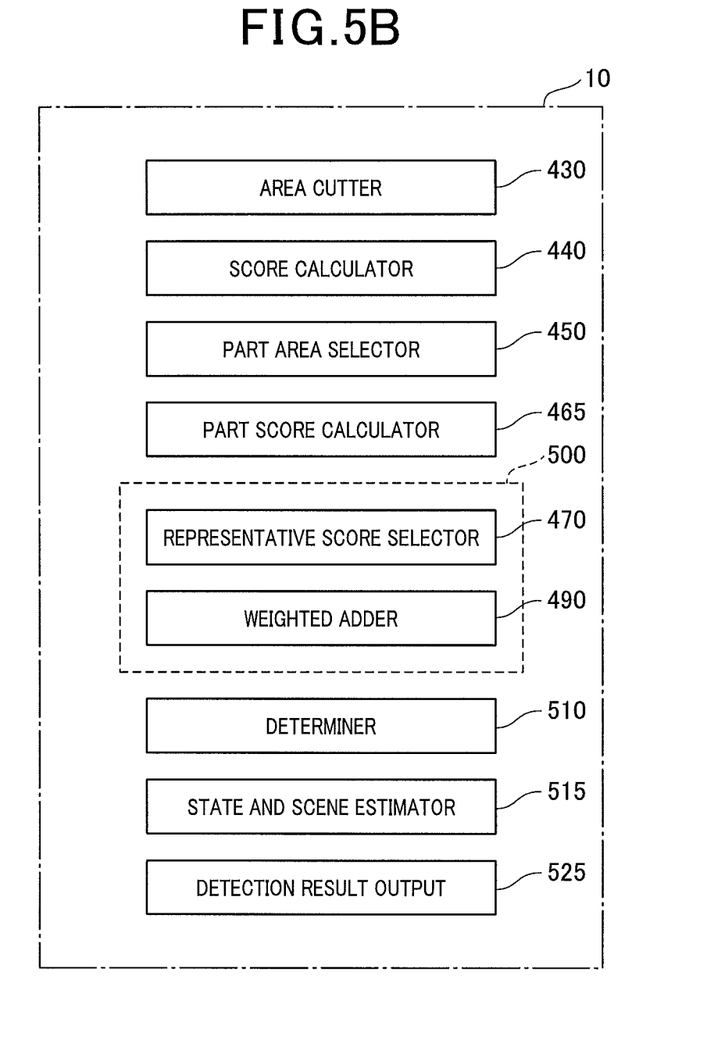
FIG. 5B shows a schematic block diagram of a processor of the second embodiment.

Referring to FIG. 5B, the processor 10 of the present embodiment includes an area cutter 430 responsible for executing the operation in step S130, a score calculator 440 responsible for executing the operation in step S140, a part area selector 450 responsible for executing the operation in step S150, a part score calculator 465 responsible for executing the operation in step S165.

The processor 10 further includes an integrated score calculator 500 responsible for executing the operations in steps S170, S190, a determiner 510 responsible for executing the operation in step S210, a state and scene estimator 515 for executing the operation in step S215, a detection result output 525 responsible for executing the operation in step S225. More specifically, the integrated score calculator 500 includes a representative score selector 470 responsible for executing the operation in step S170 and a weighted adder 490 responsible for executing the operation in step S190.

All these components of the processor 10 may be embodied by executing their associated computer programs stored in ROM (not shown) or the like of the processor 10.

(Benefits)

With the object detection apparatus 1 of the present embodiment, as with the object detection apparatus of the first embodiment, even in the presence of a large number of variations in full body appearance, the target object can be detected more accurately by means of a smaller number of the body part dictionaries for the respective part areas than the number of full body appearance variations, and the detection accuracy can be increased.

In addition, the object detection apparatus 1 of the present embodiment allows the state of the target object and the scene to be detected from the information acquired in the course of the image recognition processing without using the vehicle information.

Third Embodiment

There will now be explained a third embodiment of the present invention.

The third embodiment differs only in the image recognition from the first embodiment. Only differences of the third embodiment from the first embodiment will be explained.

(Image Recognition Process)

Figure 7A:
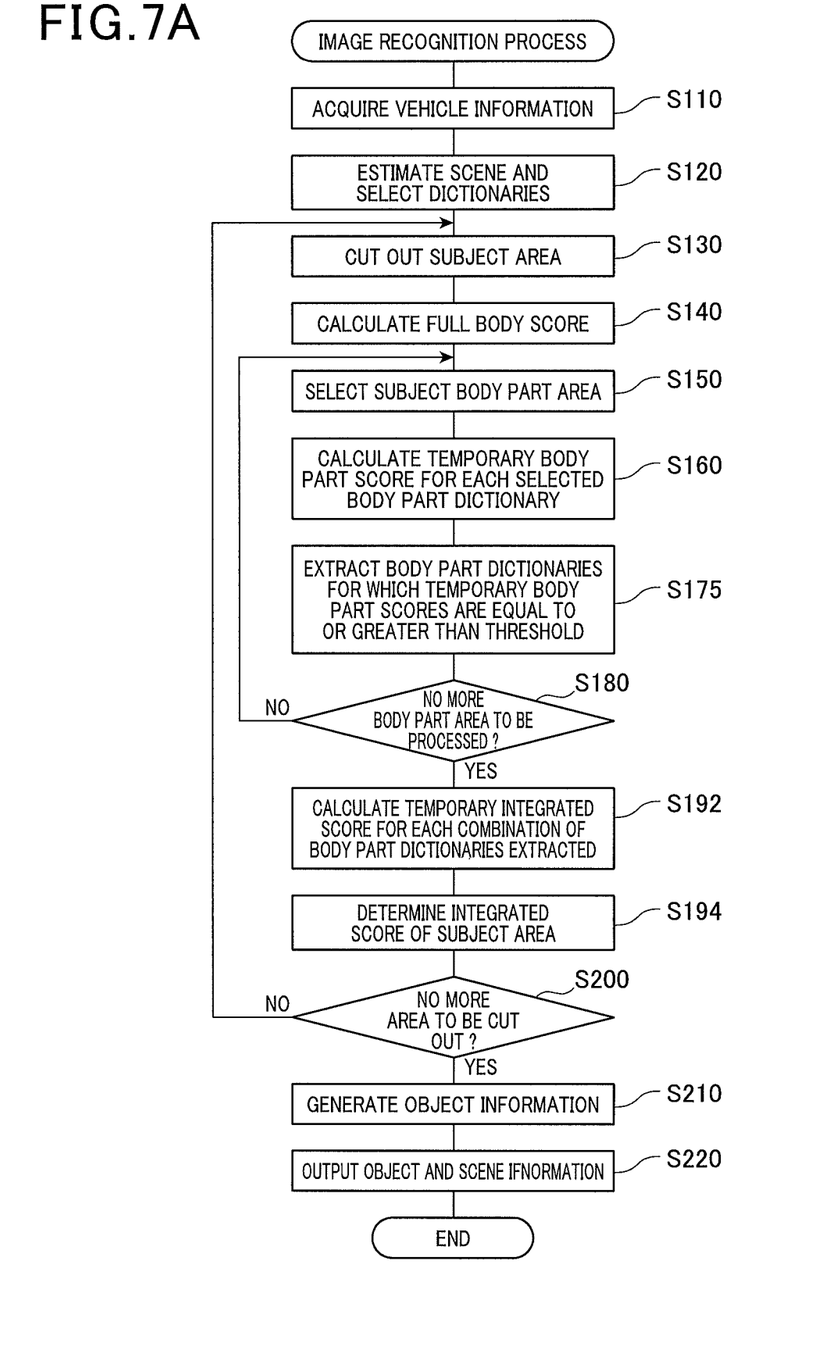
FIG. 7A shows a flowchart of an image recognition process in accordance with a third embodiment.

In the present embodiment, the image recognition process performed in the processor 10, as shown in FIG. 7A, is similar to the image recognition process of FIG. 4A except that step S175 is provided in place of step S170 and steps S192-S194 are provided in place of S190.

That is, in step S175, the processor 10 extracts, from the temporary body part scores calculated in step 160, candidate scores that are the temporary body part scores equal to or greater than a predetermined threshold, and determines the body part dictionaries that have been used to calculate the candidate scores extracted.

In step S192, the processor 10 calculates temporary integrated scores for all possible combinations of the body part dictionaries extracted in step S175 respectively belonging to the body part dictionary groups associated with the respective part areas forming the subject cut-out area. More specifically, the processor 10 calculates the temporary integrated scores, each of which is a weighted sum of the full body score calculated in step S140 and the candidate body part scores extracted in step S175 of the respective part areas forming the subject cut-out area according to a similar equation to the equation (1), where the weighting factors for the respective candidate body part scores (temporary body part scores) are obtained with reference to the weighting factor selection table as shown in FIG. 3B.

In step S194, the processor 10 determines a maximum of all the temporary integrated scores calculated in step S192 as the integrated score of the subject cut-out area.

Figure 7B:
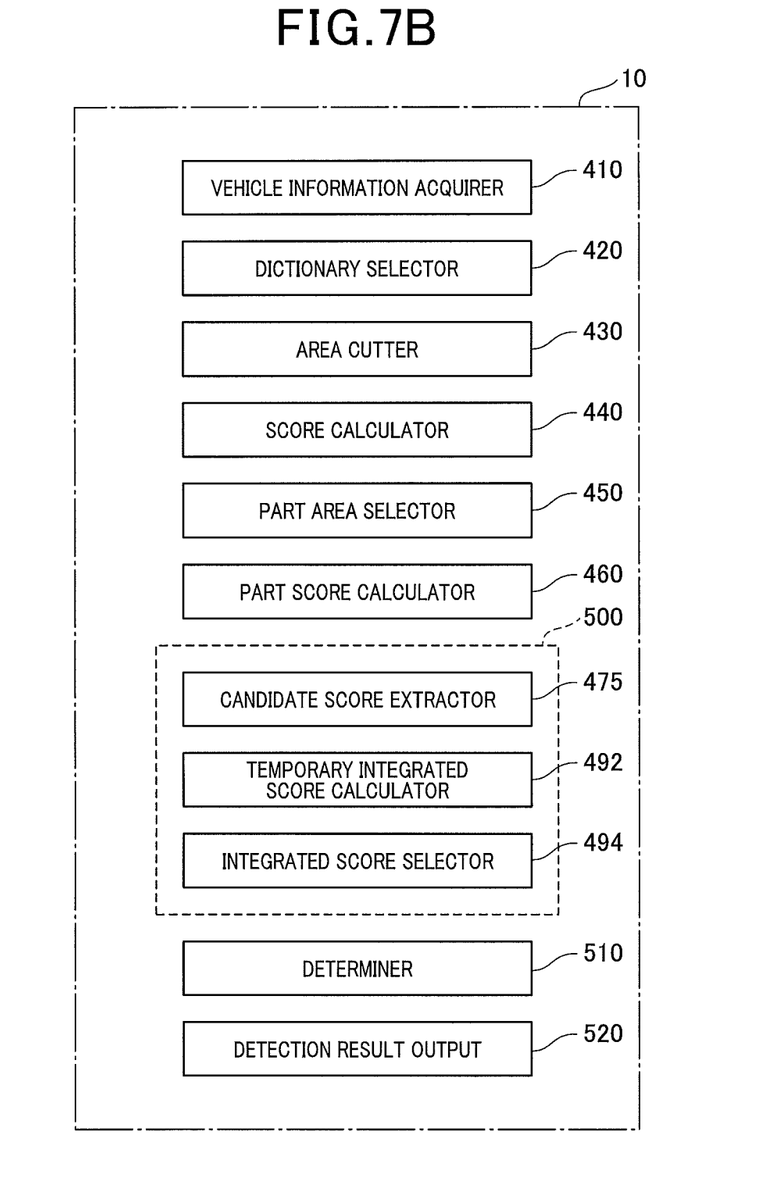
FIG. 7B shows a schematic block diagram of a processor of the third embodiment.

Referring to FIG. 7B, the processor 10 of the present embodiment includes a vehicle information acquirer 410 responsible for executing the operation in step S110, a dictionary selector 420 responsible for executing the operation in step S120, an area cutter 430 responsible for executing the operation in step S130, a score calculator 440 responsible for executing the operation in step S140, a part area selector 450 responsible for executing the operation in step S150, a part score calculator 460 responsible for executing the operation in step S160.

The processor 10 further includes an integrated score calculator 500 responsible for executing the operations in steps S175, S192, S194, a determiner 510 responsible for executing the operation in step S210, and a detection result output 520 responsible for executing the operation in step S220.

More specifically, the integrated score calculator 500 includes a candidate score extractor 475 responsible for executing the operation in step S175, a temporary integrated score calculator 492 responsible for executing the operation in step S192, and an integrated score selector 494 for executing the operation in step S194.

All these components of the processor 10 may be embodied by executing their associated computer programs stored in ROM (not shown) or the like of the processor 10.

(Benefits)

With the object detection apparatus 1 of the present embodiment, as with the object detection apparatus of the first embodiment, even in the presence of a large number of variations in full body appearance, the target object can be detected more accurately by means of a smaller number of the body part dictionaries for the respective part areas than the number of full body appearance variations, and the detection accuracy can be increased.

In the object detection apparatus 1 of the present embodiment, a plurality of body part scores (body part dictionaries) are extracted for each part area, the temporary integrated scores are calculated taking into account the validity of the combination of the body parts, and finally the integrated score used to determine the presence of the target object is determined from the temporary integrated scores, which can lead to robust detection of the target object.

In addition, in the present embodiment, as in the second embodiment in view of the first embodiment, the selection of the body part dictionaries on the basis of the scene estimated from the vehicle information may be skipped, where the scene may be estimated from the combination of the body part dictionaries used to calculate the integrated score.

Other Embodiments

It is to be understood that the invention is not to be limited to the specific embodiments disclosed above and that modifications and other embodiments are intended to be included within the scope of the appended claims. The particular features, structures, or characteristics of the embodiments may be combined in any suitable manner in one or more embodiments.

In each of the embodiments set forth above, the entire set of recognition dictionaries include the single full body dictionary and body part dictionaries for each part area. Alternatively, the full body dictionary may be removed. That is, the entire set of recognition dictionaries may consist only of the body part dictionaries for each part area. Still alternatively, the entire set of recognition dictionaries may include a plurality of full body dictionaries as well as the body part dictionaries for each part area.

In each of the embodiments set forth above, the weighting factor $\alpha$ used to calculate the integrated score and the temporary integrated scores takes a fixed value. Alternatively, as with the weighting factors for the body part scores, the value of the weighting factor $\alpha$ may be variably set according to combinations of the body part dictionaries for the respective body parts.

In each of the embodiments set forth above, the weighting factors for the respective body part scores used to calculate the integrated score and the temporary integrated scores are varied with combinations of the body part dictionaries for the respective body parts. Alternatively, the weighting factors for the respective body part scores used to calculate the integrated score and the temporary integrated scores may be varied with the scenes estimated from the vehicle information. For example, when the lower body part, such as the legs part, disappears in the input image due to closeness in distance to the target object, the weighting factors for the upper body part may be increased. When the upper body part disappears in the input image due to darkens during evening hours, the weighting factors for the lower body part may be increased. Further alternatively, given a plurality of part areas of different sizes and positions, combination of the part areas may be selected according to the scenes.

What is claimed is:

1. An object detection apparatus comprising:
   a storage storing, for each of a plurality of part areas forming an area in an input image that is subject to image recognition processing and is referred to as a subject area, image recognition dictionaries that are used to recognize a target object to be detected in the input image and are typed according to variations in appearance of a part of the target object to be detected in the part area;
   a part score calculator configured to calculate, for each of the part areas forming the subject area cut from the input image, a part score indicative of a degree of similarity between the part area and each of at least some of the image recognition dictionaries stored in the storage;
   an integrated score calculator configured to calculate an integrated score by selecting, for each of the part areas forming the subject area, one of the scores calculated in the part score calculator and then calculating a weighted sum of the selected part scores for the respective part areas of the subject area; and
   a determiner configured to determine, on the basis of the integrated score calculated in the integrated score calculator, whether or not the target object is present in the subject area; wherein
   the integrated score calculator is configured to adjust the integrated score by variably setting weighting factors used to calculate the weighted sum of the selected part scores as a function of a combination of the image recognition dictionaries involved in the calculation of the integrated score.

2. The apparatus of claim 1, wherein the integrated score calculator comprises:
   a representative score selector configured to select, for each of the part areas forming the subject area, a maximum of the part scores for the respective image recognition dictionaries as a representative score; and a weighted adder configured to calculate, as the integrated score, a weighted sum of the representative scores selected by the representative score selector for the respective part areas forming the subject area.

3. An object detection apparatus comprising:

a storage storing, for each of a plurality of part areas forming an area in an input image that is subject to image recognition processing and is referred to as a subject area, image recognition dictionaries that are used to recognize a target object to be detected in the input image and are typed according to variations in appearance of a part of the target object to be detected in the part area;

a part score calculator configured to calculate, for each of the part areas forming the subject area cut from the input image, a part score indicative of a degree of similarity between the part area and each of at least some of the image recognition dictionaries stored in the storage;

an integrated score calculator configured to calculate an integrated score by selecting, for each of the part areas forming the subject area, one of the scores calculated in the part score calculator and then calculating a weighted sum of the selected part scores for the respective part areas of the subject area; and a determiner configured to determine, on the basis of the integrated score calculated in the integrated score calculator, whether or not the target object is present in the subject area; wherein the integrated score calculator comprises:

a candidate score extractor configured to extract, for each of the part areas forming the subject area, scores equal to or greater than a predetermined threshold as candidate scores from the part scores of the part area, and determine the image recognition dictionaries used to calculate the candidate scores for the part area;

a temporary integrated score calculator configured to calculate a weighted sum of the candidate part scores for each of combinations of the image recognition dictionaries determined by the candidate score extractor for the respective part areas forming the subject area; and an integrated score selector configured to select, as the integrated score, a maximum of the temporary integrated scores calculated by the temporary integrated score calculator.

4. The apparatus of claim 1, further comprising:
an estimator configured to estimate at least one of a scene of the input image and a state of the target object on the basis of the combination of the image recognition dictionaries used to calculate the integrated score.

5. An object detection apparatus comprising:

a storage storing, for each of a plurality of part areas forming an area in an input image that is subject to image recognition processing and is referred to as a subject area, image recognition dictionaries that are used to recognize a target object to be detected in the input image and are typed according to variations in appearance of a part of the target object to be detected in the part area;

a part score calculator configured to calculate, for each of the part areas forming the subject area cut from the input image, a part score indicative of a degree of similarity between the part area and each of at least some of the image recognition dictionaries stored in the storage;

an integrated score calculator configured to calculate an integrated score by selecting, for each of the part areas forming the subject area, one of the scores calculated in the part score calculator and then calculating a weighted sum of the selected part scores for the respective part areas of the subject area;

a determiner configured to determine, on the basis of the integrated score calculated in the integrated score calculator, whether or not the target object is present in the subject area; and a dictionary selector configured to estimate a scene of the input image on the basis of information acquired from a sensor or other devices mounted in a vehicle, and select the image recognition dictionaries to be used by the part score calculator on the basis of the estimate.

6. The apparatus of claim 3, wherein the integrated score calculator comprises:

a representative score selector configured to select, for each of the part areas forming the subject area, a maximum of the part scores for the respective image recognition dictionaries as a representative score; and a weighted adder configured to calculate, as the integrated score, a weighted sum of the representative scores selected by the representative score selector for the respective part areas forming the subject area.

7. The apparatus of claim 3, further comprising:
an estimator configured to estimate at least one of a scene of the input image and a state of the target object on the basis of the combination of the image recognition dictionaries used to calculate the integrated score.

8. The apparatus of claim 5, wherein the integrated score calculator comprises:

a representative score selector configured to select, for each of the part areas forming the subject area, a maximum of the part scores for the respective image recognition dictionaries as a representative score; and a weighted adder configured to calculate, as the integrated score, a weighted sum of the representative scores selected by the representative score selector for the respective part areas forming the subject area.

9. The apparatus of claim 5, further comprising:
an estimator configured to estimate at least one of a scene of the input image and a state of the target object on the basis of the combination of the image recognition dictionaries used to calculate the integrated score.

* * * * *